United States Patent
Vogels (10) Patent No.: US 11,766,024 B2
(45) Date of Patent: Sep. 26, 2023

(54) APPARATUS AND METHOD FOR DELIVERING FEED SUPPLEMENT

(71) Applicant: RUTH CONSOLIDATED INDUSTRIES PTY LIMITED, Sydney (AU)

(72) Inventor: Anthony Maria Vogels, Paeroa (NZ)

(73) Assignee: RUTH CONSOLIDTAED INDUSTRIES PTY LIMITED, Sydney (AU)

( * ) Notice: Subject to any disclaimer, the term of this patent is extended or adjusted under 35 U.S.C. 154(b) by 303 days.

(21) Appl. No.: 17/054,698

(22) PCT Filed: May 16, 2019

(86) PCT No.: PCT/IB2019/054049
§ 371 (c)(1),
(2) Date: Nov. 11, 2020

(87) PCT Pub. No.: WO2019/220380
PCT Pub. Date: Nov. 21, 2019

(65) Prior Publication Data
US 2021/0282366 A1   Sep. 16, 2021

(30) Foreign Application Priority Data

May 18, 2018 (NZ) .......................................... 742708
Jan. 10, 2019 (AU) ................................ 2019100029

(51) Int. Cl.
*A01K 5/02* (2006.01)
*B65G 53/06* (2006.01)
(Continued)

(52) U.S. Cl.
CPC .......... *A01K 5/0275* (2013.01); *A01K 5/0225* (2013.01); *A01K 5/0291* (2013.01);
(Continued)

(58) Field of Classification Search
CPC .. A01K 5/0225; A01K 5/0275; A01K 5/0291; B65G 54/00; B65G 53/40;
(Continued)

(56) References Cited

U.S. PATENT DOCUMENTS 1,842,862 A * 1/1932 Fechtig ................... G01F 11/44
222/452
3,340,851 A   9/1967 Frank et al.
(Continued)

FOREIGN PATENT DOCUMENTS

| CN | 106796133 A | 5/2017 |
| EP | 0852211 A1 | 7/1998 |

(Continued)

OTHER PUBLICATIONS

International Search Report and Written Opinion of International Search Authority for International Application No. PCT/IB2019/054049.

(Continued)

*Primary Examiner* — Ebony E Evans
(74) *Attorney, Agent, or Firm* — JCIP; Joseph G. Chu; Jeremy I. Maynard (57) ABSTRACT

The invention is a dispensing module for use in delivering measured doses of feed supplement to an animal. It comprises a storage container for holding the supplement and a metering module that is rotatably connected to the storage container for dispensing a measured (pre-determined) dose of the supplement. The dispensing module is adapted to be moved between an open configuration and a closed configuration. In the open configuration, the measured dose of the supplement is able to be dispensed out of the dispensing module. In the closed configuration, the measured dose of the supplement is prevented from being dispensed out of the
(Continued)

dispensing module. Compressed air can be used to send the dose to an outlet when the dispensing module is closed.

19 Claims, 6 Drawing Sheets

(51) Int. Cl.
*B65G 53/50* (2006.01)
*G01F 11/44* (2006.01)
*G01F 11/46* (2006.01)

(52) U.S. Cl.
CPC ............. *B65G 53/06* (2013.01); *B65G 53/50* (2013.01); *G01F 11/44* (2013.01); *G01F 11/46* (2013.01); *B65G 2201/042* (2013.01)

(58) Field of Classification Search
CPC .. B65G 53/42; B65G 2201/042; B65G 53/50; G01F 11/42; G01F 11/44; G01F 11/46
See application file for complete search history.

(56) References Cited

U.S. PATENT DOCUMENTS

| | | | | |
|---|---|---|---|---|
| 3,494,331 A * | 2/1970 | Eckert | ...................... | A01K 5/02 119/51.11 |
| 3,727,584 A * | 4/1973 | Permann | .............. | A01K 5/0225 119/56.1 |
| 3,813,015 A * | 5/1974 | Armstrong | .............. | G01F 11/46 222/445 |
| 4,359,014 A * | 11/1982 | Molaug | .................. | A01K 61/80 119/51.04 |
| 6,257,444 B1 * | 7/2001 | Everett | .................... | G01F 11/44 222/1 |
| 2005/0024988 A1 | 2/2005 | Hoff et al. | | |
| 2011/0121017 A1 * | 5/2011 | Bergdahl | .............. | A47J 31/407 222/394 |
| 2015/0314970 A1 * | 11/2015 | McIlrath | .............. | B65D 88/548 406/146 |
| 2021/0403253 A1 * | 12/2021 | Reich | .................... | B65G 53/42 |

FOREIGN PATENT DOCUMENTS

| | | | | |
|---|---|---|---|---|
| EP | 2022379 A1 | 2/2009 | | |
| GB | 2605813 A * | 10/2022 | .......... | A01K 5/0275 |
| WO | 2013164286 A1 | 11/2013 | | |
| WO | 2017218343 A1 | 12/2017 | | |

OTHER PUBLICATIONS

International Preliminary Report on Patentability for International Application No. PCT/IB2019/054049.
Extended European Search Report dated Feb. 1, 2022 for European Application No. 19804340.8.
Euroean Examination Report dated Dec. 19, 2022 for European Application No. 19804340.8.
Chinese Office Action and Search Report dated Jan. 19, 2022 for Chinese Application No. 201980031915X.

* cited by examiner

APPARATUS AND METHOD FOR DELIVERING FEED SUPPLEMENT

FIELD OF THE INVENTION

The present invention relates to an apparatus and method suitable for delivering feed supplement to animals. More particularly, but not exclusively, it relates to an apparatus and method for delivering measured doses of feed supplement to dairy animals such as cows, goats etc.

BACKGROUND TO THE INVENTION

In order to provide a balanced diet, and to protect the dairy animals from disease, it may be desirable to feed the animals with supplements such as vitamins, minerals, proteins, enzymes, hormones, antibiotics, worm medicines, yeasts and other nutritional supplements and medications.

Traditionally, feeding additives to animals involves premixing the desired supplement(s) in dry concentrate form, usually with some dry carrier material and then storing such supplements for a period of time until ready for use. The supplement is then eventually mixed with the primary feed of the animal.

One of the problems in feeding animals using such techniques is that both the additive/supplement itself and the primary feed containing additive/supplement are often stored for long periods of time before being consumed, resulting in some supplements losing their potency through chemical breakdown and combination with other materials to which they are subjected during storage.

Also, manually delivering of supplements to the primary feed can be a labour intensive task especially if large quantities of supplements needs to be delivered to the primary feed for consumption by animals. Also, manual delivery of supplements can be error prone which is not desirable. If the doses are not proper then that can have undesirable effects for the animal. An overdose of additive can be toxic to an animal and can have other detrimental effects on the animal. Similarly, under dosing of additive can mean that the additive may not provide effective or desired results.

The foregoing drawbacks may be just some of the problems encountered with conventional apparatus and method for additive delivery into animal feed.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an apparatus for delivery of supplement(s) into animal feed that overcomes or at least partially ameliorates some of the abovementioned disadvantages or which at least provides the public with a useful choice.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprises' or 'comprised' or 'comprising' is used in relation to the apparatus or to one or more steps in a method or process.

As used herein the term "and/or" means "and" or "or", or both.

As used herein "(s)" following a noun means the plural and/or singular forms of the noun.

When used in claim and unless stated otherwise, the word 'for' is to be interpreted to mean only 'suitable for', and not for example, specifically 'adapted' or 'configured' for the purpose that is stated.

Unless otherwise stated, a feed supplement or supplement is preferably yeast, but could be any other feed supplement (or could also be a mixture of two or more supplements) such as but not limited to vitamins, minerals, proteins, enzymes, hormones, antibiotics, worm medicines or many other nutritional supplements and/or medications for the animals.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of common general knowledge in the art.

SUMMARY OF THE INVENTION

In one aspect, the invention broadly resides in an apparatus for repeated delivering of measured doses of feed supplement to a feed trough for an animal, the apparatus comprising:

a storage container adapted to store the supplement in bulk, a loading conduit extending between the storage container and a breech region, the loading conduit adapted to serve as a means via which a measured dose of the supplement is able to transfer from the storage container to the breech region, a delivery conduit connected to or integrally formed with the loading conduit, the delivery conduit extending between the breech region and a dispensing outlet, the delivery conduit adapted to guide the supplement from the breech region to the dispensing outlet and via which a measured dose of feed supplement is able to pass into a feed trough, wherein the apparatus further comprises an air delivery means for delivering a charge of air (e.g. via the loading conduit) into the breech region in order to transfer supplement in the breech region to and out of the dispensing outlet.

Preferably, the apparatus further comprises a metering module operatively connected to or forming part of storage container, the metering module adapted to dispense the measured dose of the supplement from the storage container to the loading conduit in order to be subsequently delivered to the breech region via the loading conduit.

Preferably, the metering module comprises or is connected to at least one measured dose outlet that is/are adapted to be opened or closed, wherein when the outlet is closed dispensing of the measured dose of the supplement for delivery from the storage container to the breech region is prevented, and when the measured dose outlet is opened, measured dose of the supplement is allowed to be dispensed through the measured dose outlet thereby for delivery from the storage container to the breech region.

Preferably, the at least one measured dose outlet is adapted to be opened or closed using air pressure, preferably compressed air pressure.

Preferably, the at least one measured dose outlet is adapted to be opened or closed using at least one pneumatic actuator.

Preferably, the at least one pneumatic actuator comprises a pneumatic cylinder and/or air ram.

Preferably, dispensing of the measured dose of the supplement into the breech region occurs under the action of gravity.

Preferably, dispensing of the measured dose of the supplement into the breech region occurs under the action of air pressure, preferably compressed air pressure.

Preferably, the apparatus further comprises at least one valve that is located in the loading conduit between the metering module and the breech region, the at least one valve being adapted to seal or unseal a portion of the loading conduit in order to respectfully and may prevent or allow the delivery of the supplement into the breech region.

Preferably, the at least one valve is a ball valve.

Preferably, the at least one valve is a pneumatic valve.

Preferably, the air delivery means is adapted to deliver the charge of air into the loading conduit between the at least one valve and the breech region so that when the portion of the loading conduit is sealed by the at least one valve, the at least one valve is configured to prevent the charge of air delivered from the air delivery means from flowing to the storage container or the metering module.

Preferably, the air delivery means is located between the at least one valve and the breech region.

Preferably air delivery means may comprise an air pulse valve which may be switch on to deliver the charge of air in the loading conduit or switched off to not deliver any charge of air to the loading conduit.

Preferably, switching on or off of the air pulse valve is controlled by a timer.

Preferably, the air delivery means is adapted to deliver a charge of compressed air into the breech region, in order to transfer the supplement in the breech region to be discharged out from the apparatus through the dispensing outlet.

Preferably, the feed supplement is or comprises yeast.

Preferably, the feed supplement is in a powdered form.

Preferably, the feed supplement is in a fluid form.

Preferably, the feed supplement is in a granular form.

Preferably, the storage container is located above the breech region.

Preferably, the apparatus comprises an air storage module for storing supply of air (such as compressed air) to be delivered from the air delivery means and at least the air delivery means is operatively connected to the air storage module in order to deliver charge of air to the breech region.

Preferably, the at least one measured dose outlet is adapted to be opened or closed using air (or compressed air).

Preferably, the at least one valve is adapted to operate using air (or compressed air).

Preferably, the supplement from the dispensing outlet is adapted to be delivered to an animal feeding trough.

Preferably, the animal feeding trough is part of the apparatus.

Preferably, the animal feeding trough is part of or adjacent a milking shed.

Preferably, the animal feeding trough is part of or adjacent a rotary milking shed In a second broad aspect, the invention resides in a method of delivering repeated measured doses of feed supplement to an animal feeding trough from a storage container containing the supplement in bulk, the method comprising:

from the storage container, located adjacent (and preferably above) a breech region of or in communication with a delivery conduit that extends from the breech region to a dispensing outlet and via which a measured dose of feed supplement is able to pass and into the feed trough, dispensing a measured dose into the breech region via a loading conduit extending between the container and breech region, closing fluid communication between said container and said breech region via said loading conduit, delivering a charge of air to said breech region to cause the supplement in the breech region to travel out of the dispensing outlet, opening fluid communication between said container and said breech region via said loading conduit, to allow the next dose of supplement from said container to enter the breech region.

Preferably the dispensing of the measured dose occurs by a mechanism that allows a dose portion of the supplement in bulk to be partition from the supplement in bulk and subsequently be delivered to said breech region.

Preferably the dispensing of the measured dose occurs by a mechanism that allows a dose portion of the supplement in bulk to be partition from the supplement in bulk and subsequently be released from its partitioning condition and then be delivered to said breech region.

Preferably the dispensing of the measured dose occurs by a mechanism that allows a dose portion of the supplement in bulk to be partition from the supplement in bulk and subsequently be delivered to said breech region under the action of gravity.

Preferably, the apparatus comprises or is operatively connected to a filter and regulator module that for regulating the charge of air and/or to filter out any dust and/or water.

Preferably, the apparatus comprises at least one velocity control valve(s) that is/are adapted to control the velocity and/or duration and/or pressure of the charge of the air.

Preferably the dispensing of the measured dose occurs by a mechanism that allows a dose portion of the supplement in bulk to be partition from the supplement in bulk and subsequently be delivered to said breech region by a materials transfer mechanism (e.g. a screw auger).

In a third broad aspect, the invention resides in a dispensing module for use in delivering measured doses of feed supplement to an animal, the dispensing module comprising:

a storage container for containing a volume of the supplement;

a metering module that is rotatably connected to the storage container for dispensing a measured (pre-determined) dose of the supplement, wherein the dispensing module is adapted to be moved between an open configuration and a closed configuration, wherein in the open configuration, the measured dose of the of the supplement is able to be dispensed out of the dispensing module, and wherein in the closed configuration, the measured dose of the supplement is prevented from being dispensed out of the dispensing module.

Preferably the dispensing module and method herein described allows for around 3.2 grams of yeast to be delivered to an animal each day.

Preferably the delivery is done twice a day at around 1.6 grams each time.

Preferably the delivery conduit is between 4 and 8 mm in inside diameter at its region adjacent the outlet.

Preferably the delivery conduit is 6 mm in inside diameter at its region adjacent the outlet.

Preferably the breech region is of the delivery conduit comprises a vertical section via which a dose of supplement is received and a landing portion onto which the dose can settle prior to being subjected to the charge of air.

Preferably the breech region is a bent section of the delivery conduit.

Preferably the bent section is of an inside diameter of between 4 and 8 mm.

Preferably the bent section is of an inside diameter of 6 mm.

Preferably the bent section is of a diameter such that the dose of supplement settling at the landing portion occludes a substantial part of the delivery conduit.

Preferably the method is used for delivery of supplement to a feeding trough of a rotary milking shed.

Preferably the apparatus or module herein described is used for delivery of supplement to a feeding trough of a rotary milking shed.

These and other aspects of the invention may become apparent from the following description which is given by way of example only and with reference to the accompanying drawings.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following description are simply exemplary embodiments of the invention. Hence, specific dimensions and other physical characteristics related to the embodiments disclosed herein are not to be considered as limiting.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIG. 3b shows a top view of the dispensing module of FIG. 3a.

Figure 1:
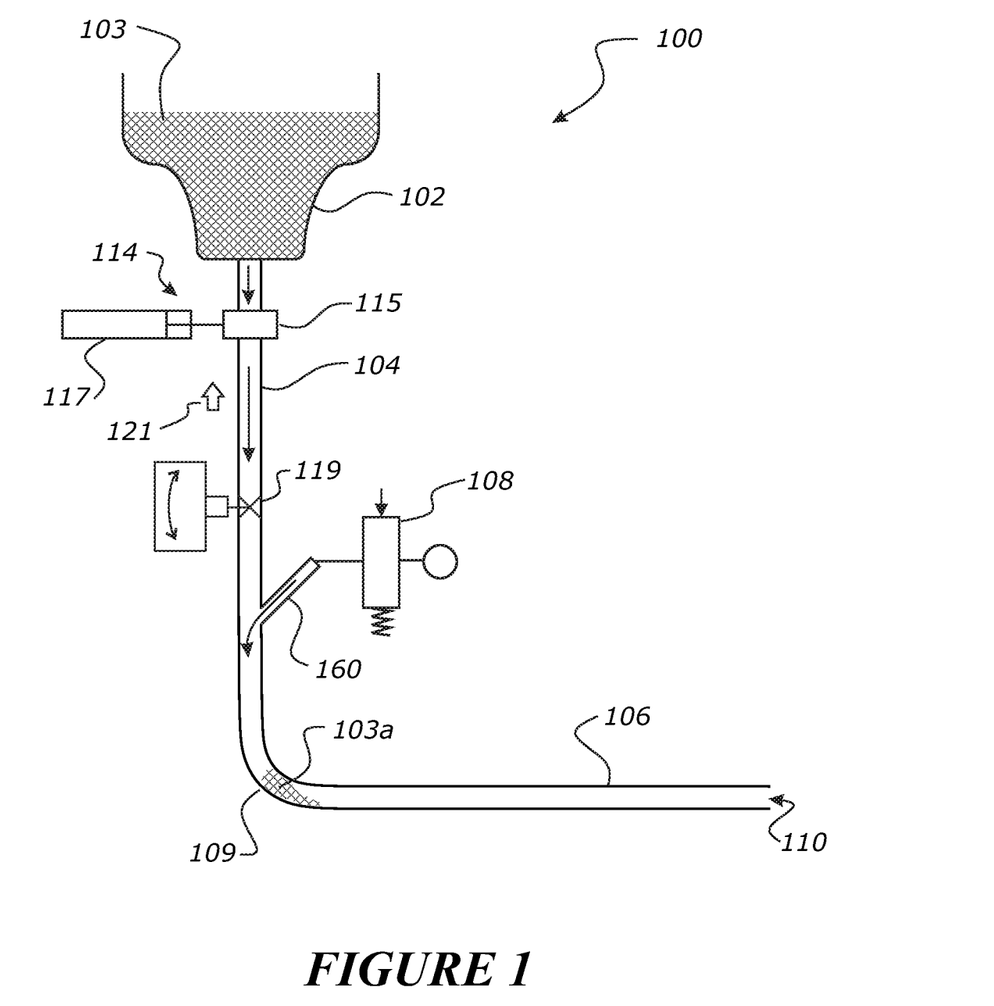
FIG. 1 shows one preferred example/embodiment of an apparatus for delivering measured doses of feed supplement to an animal.

Reference will now be made to the accompanying drawings in which FIG. 1 shows one preferred example/embodiment of an apparatus (100) for delivering measured doses of feed supplement to an animal. The apparatus comprises a storage container (102), a loading conduit (104), a delivery conduit (106) and an air delivery means (108).

The storage container (102) is adapted to store the feed supplement (103) in bulk. The feed supplement (103) is preferably yeast, but could be any other feed supplements such as but not limited to vitamins, minerals, proteins, enzymes, hormones, antibiotics, worm medicines or many other nutritional supplements and/or medications for the animals.

As it can be shown in FIG. 1, the loading conduit (104) extends between the storage container (102) and a breech region (109), which in this example is located below the storage container (102). The loading conduit (104) is adapted to serve as a means to transfer/deliver a measured dose of the supplement from the storage container (104)) to the breech region (109).

A delivery conduit (106) is connected to or is integrally formed with the loading conduit (104). The delivery conduit (106) extends between the breech region (109) and a dispensing outlet (110) which is also part of the apparatus (100). The dispensing conduit (106) is adapted to transfer the supplement from the breech region (109) to the dispensing outlet (110).

The air delivery means (108) is suitable for delivering a charge of air into the breech region (109) in order to transfer the supplement from the breech region (109) to the dispensing outlet (110).

The apparatus (100) may comprise a metering module (114). This may be operatively connected to the storage container (102) or forms part of the storage container (110).

The metering module (114) is adapted to dispense a measured dose of the supplement (103) from the storage container (102) to the loading conduit (104) in order to be subsequently delivered to the breech region via the loading conduit.

Preferably, the metering module (114) comprises at least one measured dose outlet (115) that is adapted to be in open or closed configuration. When the measured dose outlet(s) (115) is/are in closed configuration, dispensing of the measured dose of the supplement (103) for delivery from the storage container to the breech region (109) is prevented, and when the measured dose outlet(s) is/are (115) is/are in open configuration, measured dose of the supplement (103) is dispensed through the outlet (115) for delivery from the storage container (102) to the breech region (109).

The measured dosed outlet(s) (115) may be adapted to be moved between open or close configuration by an air pressure operated mechanism, preferably using compressed air pressure. The measured dose outlet(s) (115) is/are adapted to be opened or closed using at least one pneumatic actuator (117). The pneumatic actuator (117) may comprise a pneumatic cylinder and/or air ram.

A person skilled in the art may appreciate that the dispensing of the measured dose of the supplement (103) into the breech region (109) may occur under the action of gravity because in the example shown; the breech region (109) is located below the storage container (102). Alternatively or additionally, dispensing of the measured dose of the supplement (103) into the breech region (109) may also occur under the action of air pressure, preferably air pressure.

The apparatus further comprises at least one valve (119) (such as a ball valve or any other suitable pneumatic or non-pneumatic operated valve). The valve(s) (119) may be located in the loading conduit (104) between the metering module (114) and the breech region (109). The valve(s) (119) is/are adapted to seal or unseal the loading conduit in order to respectively prevent or allow the delivery (ejection) of the supplement (103) into the breech region (109).

As shown in FIG. 1, air delivery means (108) may be adapted to deliver the charge of air in the loading conduit (104) between the valve(s) (119) and the breech region (109). When the portion of the loading conduit (104) is sealed by the valve(s) (119), the valve(s) may prevent any air from the air delivery means (108) from passing in a direction shown by arrow (121), i.e. the direction towards the storage container (102) or the metering module (114).

The air delivery means (108) may be located between the valve(s) (119) and the breech region (109) as shown in FIG. 1. Alternatively, the air delivery means (108) may be located in some other location and is adapted to deliver the charge of air in the loading conduit (104) between the valve(s) (119) and the breech region (109).

The air delivery means (108) may comprise or be in a form of an air pulse valve which may be switched on to deliver the charge of air in the loading conduit (104) or switched off to not deliver any charge of air to the loading conduit (104). Preferably, switching on or off of the air pulse valve is controlled by a timer.

The air delivery means (108) may be adapted to deliver a charge of compressed air into the breech region (109). A junction (160) of the loading conduit (104) and a conduit of the delivery means (108) may be provided to allow injection of air into the leading conduit from the delivery means (108).

The supplement (103) is preferably a yeast or a mixture of multiple supplements. The supplement (103) may be in a powdered form and/or a fluid form and/or granular form and/or a liquid form and/or paste form and/or in the form of solid pieces. The supplements may be a dietary/nutritional supplement and/or medicament.

The storage container (102) is preferably located above the breech region (109). However, this is optional. The storage container may be located in many other suitable locations and transfer of supplements to the breech location (109) may still be possible due to the action of the supplied force such as air pressure.

In the preferred form the breech region can receive a measured dose of supplement from above. The breech region is preferably the start of the delivery conduit and has an entrance presented upwardly to allow a dose to drop from above into the breech region. The breech region has a base or bottom or floor presented or landing portion below the entrance where the dose can fall onto and settle. The dose should settle as a pile on the base. The delivery conduit at the breech is preferably of a diameter so that the pile of supplement substantially occludes the delivery conduit. This allows for a good build-up of air charge to occur behind the pile, effectively sending the pile as slug down the delivery conduit. Should the pile not substantially occlude the delivery conduit then the air charge may at least in part pass over the pile and not be as effective at sending the supplement down the delivery conduit.

Preferably the dispensing module and method described allows for around 3.2 grams of yeast to be delivered to an animal each day. This may be done twice a day at around 1.6 grams each time. Preferably the delivery conduit is between 4 and 8 mm in inside diameter at its region adjacent the outlet. Preferably the delivery conduit is 6 mm in inside diameter at its region adjacent the outlet. It may be the same dimension at the breech region. Preferably the breech region is a bent section of the delivery conduit. The bent section may bend through 90 degrees. It may bend through more than 90 degrees. It may form a partial of complete U-shape to define a trough for the dose to settle prior to be being blasted out through the delivery conduit.

Although, not shown in FIG. 1, the apparatus (100) may optionally comprise an air storage module (such as tank or cylinder) for storing supply of air (such as compressed air) to be delivered from the air delivery means (108) in which case the air delivery means (108) may be operatively connected to the air storage module in order to deliver charge of air to the breech region. Alternatively, the apparatus may only comprise suitable connection means for connecting to the source of air supply.

The measured dose outlet(s) (115) and/or the valve(s) (119) may be adapted to be opened or closed using air (or compressed air)

The supplements from the dispensing outlet (110) may be adapted to be delivered to an animal feeding trough (not shown) which could be part of the apparatus or part of or adjacent a milking shed (not shown). The milking shed can be a rotary milking shed.

An example of operating the apparatus (100) will now be described.

Signal (preferably 24 VDC power) may be supplied from a power source which may cause the actuator (117) to open the measured dose outlet (115) and also the valve(s) (119) to open. This will at the same time allow a measured dose (preferably, of a pre-determined quantity, e.g. 1.6 grams) of the supplement to fall/transferred to the breech region (109).

After a certain time (preferably a pre-determined time, e.g. approximately 2 seconds) the measured dose outlet (115) and the valve (s) (119) may close. Then after a certain interval of time (preferably, a pre-determined time, e.g. at approximately 3 seconds), the air delivery means (112) may turn on and blow a measured dose of supplement at breech region (109) through delivery conduit (106) and may cause the measured dose of the supplement (103) to eject to a feed trough through the dispensing outlet (110) of the apparatus (100).

After about a certain time (preferably predetermined, e.g. approximately 1.5 seconds), the air delivery means (112) may turn off and the apparatus may be ready to start the cycle again.

Figure 2:
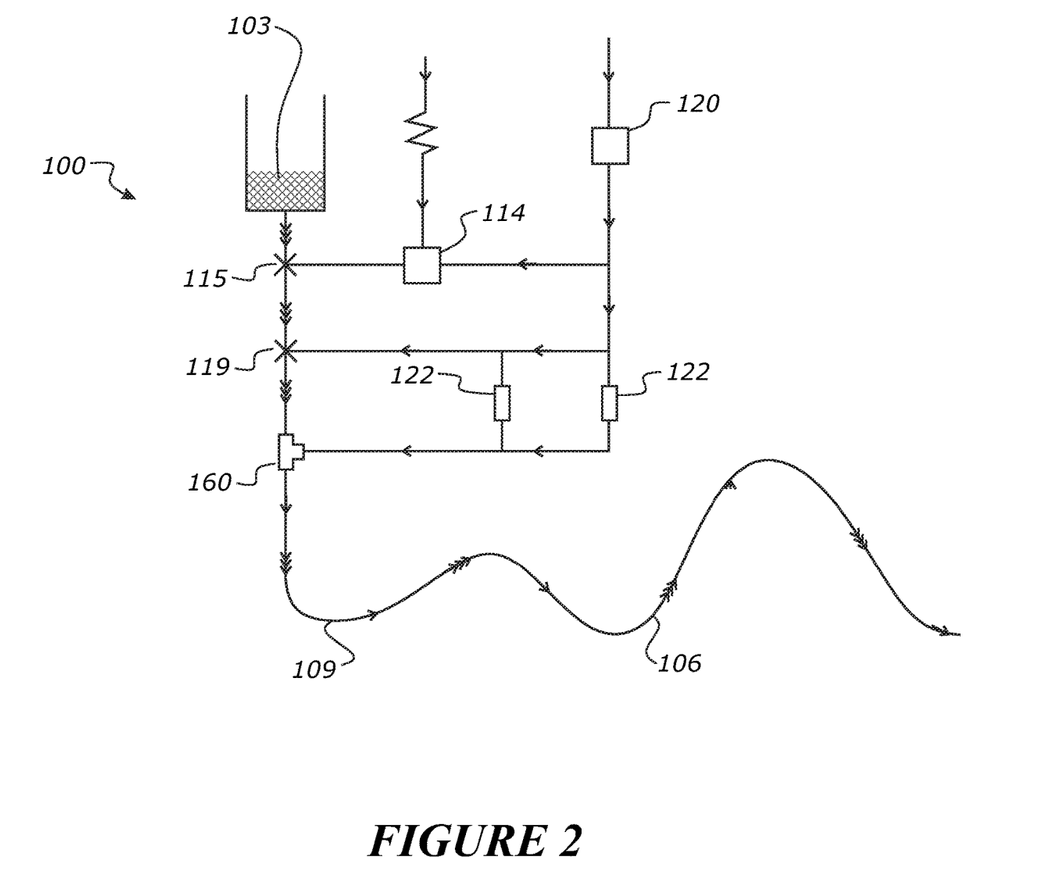
FIG. 2 is a schematic diagram of the apparatus for FIG. 1 with other optional components.

The apparatus (100) may also comprise or is connected to a filter and regulator module (120) and/or at least one velocity control valves (122) as shown in FIG. 2. FIG. 2 shows two velocity control valves (122). The filter and regulator module may be adapted to regulate the charge of air (such as compressed air) and/or to filter out any dust and/or water. The velocity control valve(s) (122) is/are adapted to control the velocity and/or duration and/or pressure of the charge of the air.

FIGS. 3a-3d shows one example of a preferred embodiment of a dispensing module (300) for use with the apparatus (100) as described above. The dispensing module (300) of this example may be used in the apparatus (100) as described above in order to replace of the storage container (102) and the metering module (114). It is again emphasised here that the dispensing module (300) as will be described below is only one example of various alternative form of dispensing modules that a person skilled in the art may envisage to be suitable for the purpose of providing the same or similar functionality.

Figure 3A:
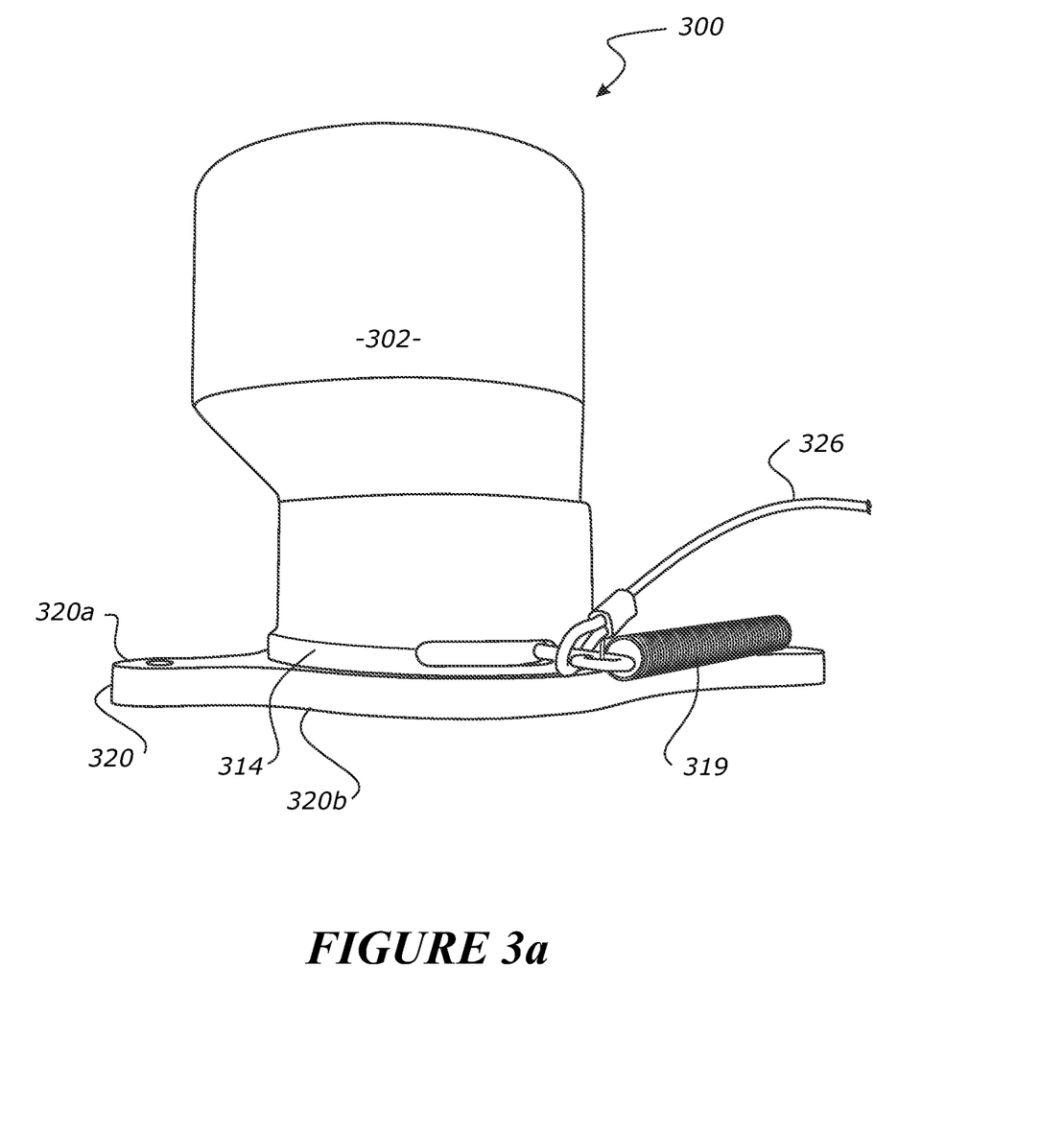
FIG. 3a shows a side view of a dispensing module to be used as part of an apparatus of the present invention.
Figure 3B:
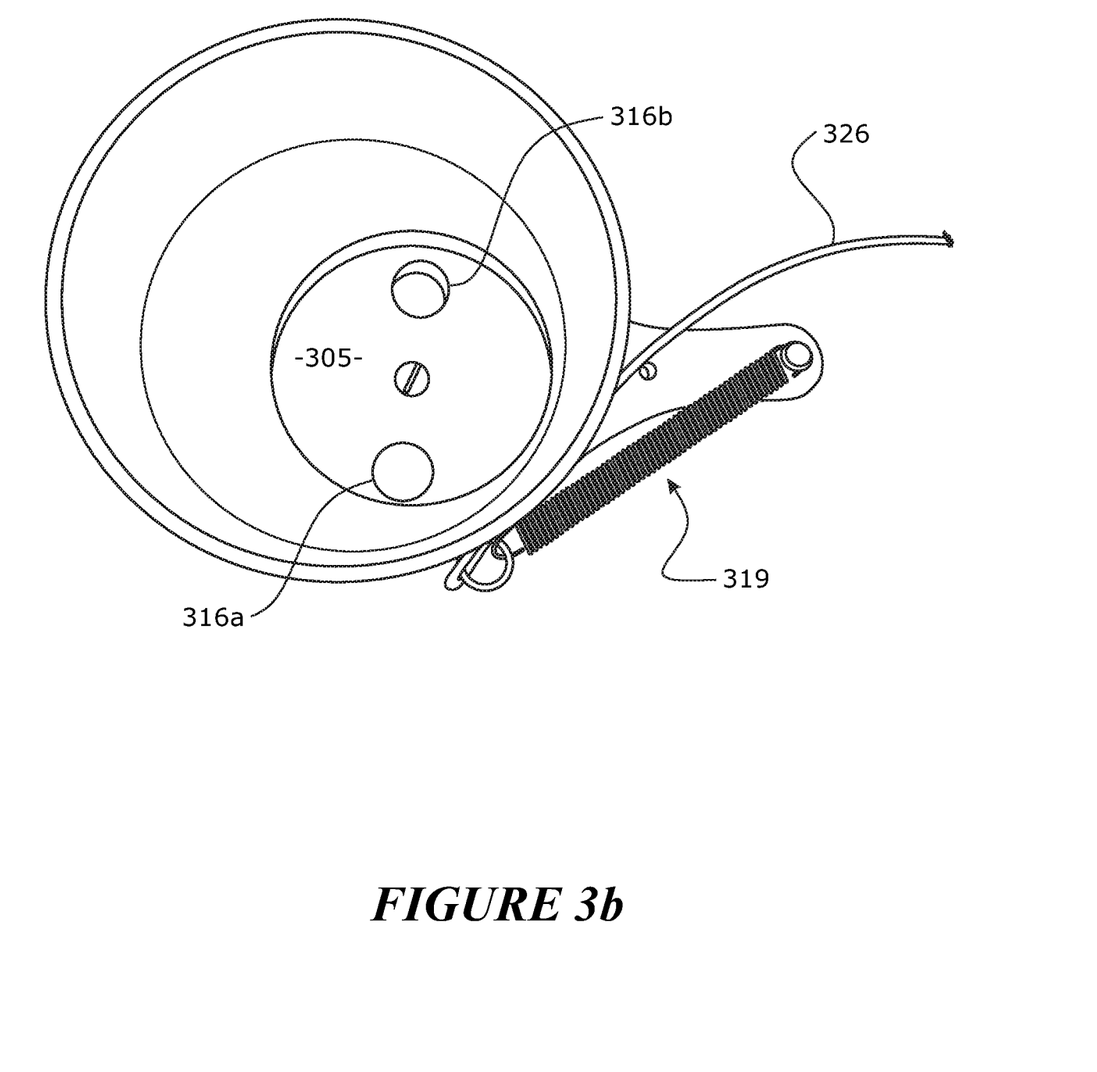

As shown in FIGS. 3a to 3b, the dispensing module (300) of this example may comprise a storage container (302) (preferably cylindrical or substantially cylindrical or funnelled shaped) with a closed end (305) at its base. The closed end (305) preferably comprises one or more see through apertures of a particular diameter. In this example, it is shown that the closed end (305) comprises two apertures (316a and 316b).

The dispensing module (300) further comprises a metering module (314) which may be of pre-determined thickness (for the reasons as will be explained later). The metering module (314) may also have at least one see through aperture. In this example, the metering module (314) has two see through apertures (318a, 318b).

The apertures (316a, 316b) of the closed end (305) of the storage container (302) and those of the metering module (317) may both be circular and of the same diameter.

Figure 3C:
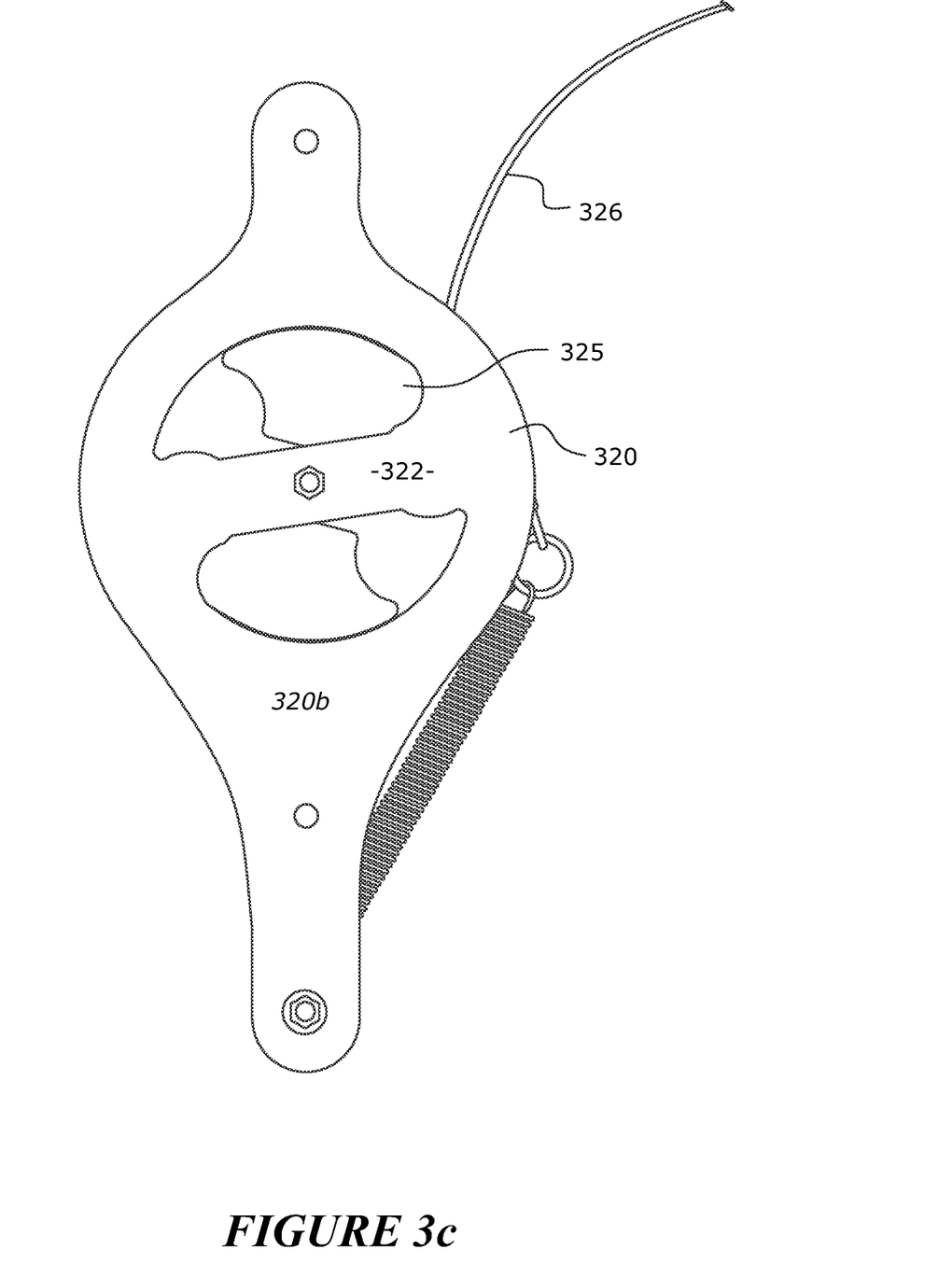
FIG. 3c shows a bottom view of the dispensing module of FIG. 3a in a closed configuration.

The metering module (314) may be rotatably mounted to the storage container (302) below the closed end (315) of the storage container (302) in a plane that is parallel to the plane in which the closed end (315) of the storage container (302) is located. Preferably, the metering module (314) is physically in contact with the closed end (305). The metering module may be adapted to at least partially rotate either in a clockwise or anticlockwise direction about an axis that is orthogonal to the plane on which the closed end (305) of the storage container (302), and the metering module (314) are located. Preferably, the metering module (114) is biased using biasing means (319) (for example spring) to rotate to a condition in which the apertures (316a, 316b) of the closed end (305) are aligned with the apertures (318a, 318b) of the metering module (314). FIGS. 3b and 3c shows such condition.

Figure 3D:
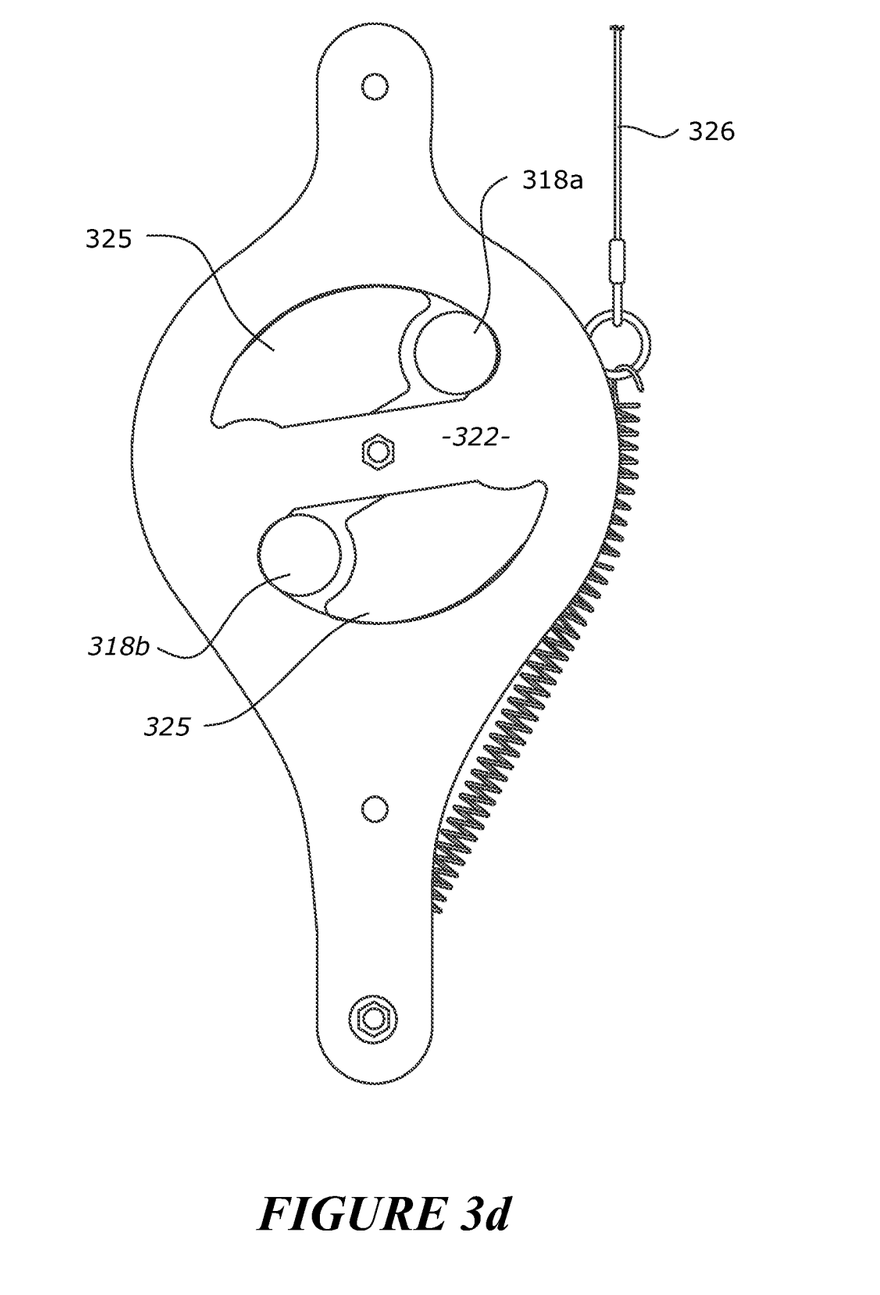
FIG. 3d shows a bottom view of the dispensing module of FIG. 3a in an open configuration.

The dispensing module (300) may further comprise a base portion (320) having an upper surface (320a) and a lower surface (320b). The metering module (314) may be supported on the upper surface (320) of the base portion (320). As shown in FIGS. 3c and 3d, the base portion (320) may comprise a dispensing outlet (325) through which the material contained in the storage container may exit (as will be described later). There may be concealment means (322) (which can be in a form of a bar or similar) extending from one end of the dispensing outlet (325) to another end of the dispensing outlet (325). The concealment means (322) may be adapted to conceal apertures (318a, 318b) of the metering module (314) from bottom during a normally biased condition where the apertures (316a, 316b) of the closed end (305) are aligned with the apertures (318a, 318b) of the metering module (314).

The dispensing module (300) may comprise an actuating means (326) (such as cable) which when actuated against the force exerted by the biasing means (319) may cause the apertures (316a, 316b) of the closed end (305) to misalign with the apertures (318a, 318b) of the metering module and also cause the apertures (318a, 318b) of the metering module (314) that were otherwise concealed from bottom by the concealment means (322) to be revealed, thereby causing material/supplement stored in the storage unit to be dispensed from the dispensing outlet (325) of the dispensing module (300). This condition is shown in FIG. 3d.

During use, the storage container (302) will be filled with the material/supplement that is to be delivered to the primary feed of the animal. At the normal biased condition, the apertures (316a, 316b) of the closed end (305) are aligned with the apertures (318a, 318b) of the metering module (314). The particular dose of the material/supplement will be present in the apertures (318a, 318b) of the metering module (314) due to gravity. It may be appreciated that the volume of the material/supplement present in the apertures (318a, 318b) can depend upon the thickness of the metering module (314). For example, if the thickness of the metering module (314) is large that may mean the depth of the apertures (318a, 318b) will also be large, which consequently may mean that the apertures (318a, 318b) will be able to contain larger volume of material/supplement stored in the storage container (302).

During the biased or closed condition as shown in FIGS. 3b and 3c, the concealment means (322) will conceal apertures (318a, 318b) of the metering module (314) from bottom, which means the material/supplement present in the apertures (318a, 318b) of the metering module will be prevented from exiting through the discharge outlet (325).

By actuating the actuating means (326), the dispensing module (300) will be in unbiased or open condition as shown in FIG. 3d, which means that the concealment means (322) will no longer conceal the apertures (318a, 318b) of the metering module (314) from bottom, thereby causing the specific dose (i.e. volume of material/supplement present in the apertures (318a, 318b) to exit the dispensing module (300) through the dispensing outlet (325).

The actuating means (326) may be actuated manually or by using other actuators such as pneumatic actuator as described above with reference to FIG. 1. Also, it can be appreciated that in some cases a particular number of actuation may be necessary to deliver appropriate and desired amount of material/supplement. For example, if the two apertures (318a, 318b) are sized so as to deliver a maximum of 1.6 grams of supplements in total at one time, and the desired quantity of delivery is 3.2 grams, the actuating means may need to be actuated twice. Similarly, if the desired quantity of delivery is 4.8 grams, the actuating means may be actuated three times and so on.

Preferably, the apertures (318a, 318b) of the metering module are dimensioned and/or numbered so that one actuation of the actuating means is enough to deliver the right dose of the supplement.

It will of course be realised that while the foregoing has been given by way of illustrative example of the present invention, all such modifications and variations thereto as would be apparent to a person skilled in the art are deemed to fall within the broad scope and ambit of the various aspects if invention as is hereinbefore described and/or defined in the claims.

The invention claimed is:

1. A feed supplement delivering apparatus for repeated delivering of measured doses of feed supplement to a feed trough for an animal, the apparatus comprising:
   a storage container adapted to store the feed supplement in bulk,
   a loading conduit extending between the storage container and a breech region, the loading conduit adapted to serve as a means via which a measured dose of the supplement is able to transfer from the storage container to the breech region,
   a delivery conduit connected to or integrally formed with the loading conduit, the delivery conduit extending between the breech region and a dispensing outlet, the delivery conduit adapted to guide the supplement from the breech region to the dispensing outlet and via which the measured dose of feed supplement is able to pass into a feed trough,
   wherein the apparatus further comprises:
   an air delivery means for delivering a charge of air into the breech region in order to transfer supplement in the breech region to and out of the dispensing outlet,
   a metering module that is connected to the storage container to dispense the measured dose of the feed supplement from the storage container to the loading conduit in order to be subsequently delivered to the breech region via the loading conduit, the metering module being mounted to the storage container below a closed end of the storage container in a plane that is parallel to a plane in which the closed end of the storage container is located, the closed end having at least one aperture, the metering module adapted to at least partially rotate about an axis that is orthogonal to the plane in which the closed end of the storage container is located, and at least one valve that is located in the loading conduit between the metering module and the breech region, the at least one valve being adapted to selectively seal and unseal a portion of the loading conduit and wherein the air delivery means is adapted to deliver the charge of air into the loading conduit between the at least one valve and the breech region so that when the portion of the loading conduit is sealed by the at least one valve, the at least one valve is configured to prevent the charge of air delivered from the air delivery means from flowing to the storage container or the metering module, and wherein the air delivery means is located between the at least one valve and the breech region.

2. The apparatus as claimed in claim 1 wherein the metering module comprises or is connected to at least one measured dose outlet that is/are adapted to be opened or closed, wherein when the outlet is closed dispensing of the measured dose of the feed supplement for delivery from the storage container to the breech region is prevented, and when the measured dose outlet is opened, measured dose of the feed supplement is allowed to be dispensed through the measured dose outlet for delivery from the storage container to the breech region.

3. The apparatus as claimed in claim 2 wherein the at least one measured dose outlet is adapted to be opened or closed using air pressure or compressed air pressure.

4. The apparatus as claimed in claim 2 wherein the at least one measured dose outlet is adapted to be opened or closed using at least one pneumatic actuator.

5. The apparatus as claimed in claim 4 wherein the at least one pneumatic actuator comprises a pneumatic cylinder and/or air ram.

6. The apparatus as claimed in claim 1 wherein dispensing of the measured dose of the supplement into the breech region occurs under the action of gravity, or under the action of air pressure or compressed air pressure.

7. The apparatus as claimed in claim 1 wherein the at least one valve is a ball valve.

8. The apparatus as claimed in claim 1 wherein the at least one valve is a pneumatic valve.

9. The apparatus as claimed in claim 1 wherein the air delivery means comprises an air pulse valve which is switched on to deliver the charge of air in the loading conduit or switched off to not deliver any charge of air to the loading conduit.

10. The apparatus as claimed in claim 9 wherein switching on or off of the air pulse valve is controlled by a timer.

11. The apparatus as claimed in claim 1 wherein the feed supplement is or comprises yeast.

12. The apparatus as claimed in claim 1 wherein the feed supplement is in a powdered form.

13. The apparatus as claimed in claim 1 wherein the feed supplement is in a fluid form.

14. The apparatus as claimed in claim 1 wherein the feed supplement is in a granular form.

15. The apparatus as claimed in claim 1 wherein the storage container is located above the breech region.

16. The apparatus as claimed in claim 1 wherein the apparatus comprises an air storage module for storing supply of air or compressed air to be delivered from the air delivery means and at least the air delivery means is operatively connected to the air storage module in order to deliver charge of air to the breech region.

17. The apparatus as claimed in claim 1 wherein the at least one valve is adapted to operate using air or compressed air.

18. The apparatus as claimed in claim 1 wherein the feed trough is part of the apparatus, or is part of or adjacent a milking shed, or is part of or adjacent a rotary milking shed.

19. A dispensing module of a feed supplement delivering apparatus, the dispensing apparatus being configured to be used in delivering measured doses of feed supplement to an animal, the dispensing module comprising:

a storage container for containing a volume of the feed supplement;

a metering module that is connected to the storage container to dispense a measured dose of the feed supplement, the metering module being mounted to the storage container below a closed end of the storage container in a plane that is parallel to a plane in which the closed end of the storage container is located, the closed end having at least one aperture, the metering module adapted to at least partially rotate about an axis that is orthogonal to the plane in which the closed end of the storage container is located, the dispensing module being adapted to be moved between an open configuration and a closed configuration, wherein in the open configuration, the measured dose of the feed supplement is able to be dispensed out of the dispensing module, and wherein in the closed configuration, the measured dose of the feed supplement is prevented from being dispensed out of the dispensing module, wherein the apparatus comprises:

a loading conduit extending between the storage container and a breech region, the loading conduit adapted to serve as a means via which the measured dose of the feed supplement is able to transfer from the storage container to the breech region, a delivery conduit connected to or integrally formed with the loading conduit, the delivery conduit extending between the breech region and a dispensing outlet, the delivery conduit adapted to guide the feed supplement from the breech region to the dispensing outlet and via which a measured dose of feed supplement is able to pass into a feed trough, at least one valve that is located in the loading conduit between the metering module and the breech region, and an air delivery means located between the at least one valve and the breech region for delivering a charge of air into the breech region in order to transfer the feed supplement in the breech region to and out of the dispensing outlet.

* * * * *